INVENTOR.
Jakob Koch

INVENTOR.
Johnt Koch
BY
his Attorney

Jan. 19, 1965
J. KOCH
3,166,118
ROTOR END SEALING MEANS FOR ROTARY
REGENERATIVE HEAT EXCHANGERS
Filed March 2, 1960
4 Sheets-Sheet 3
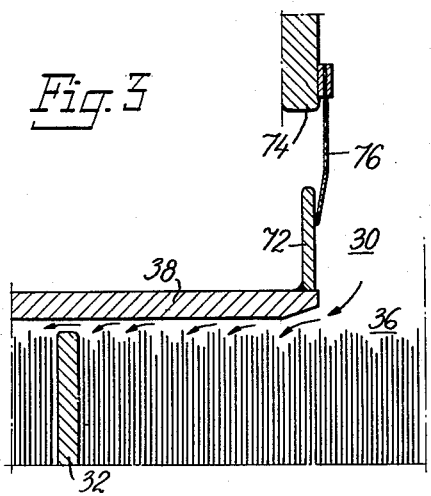
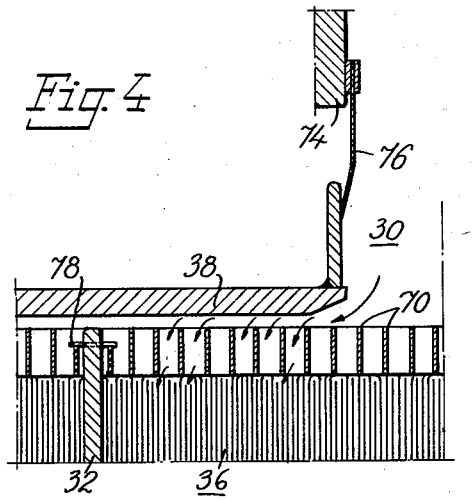
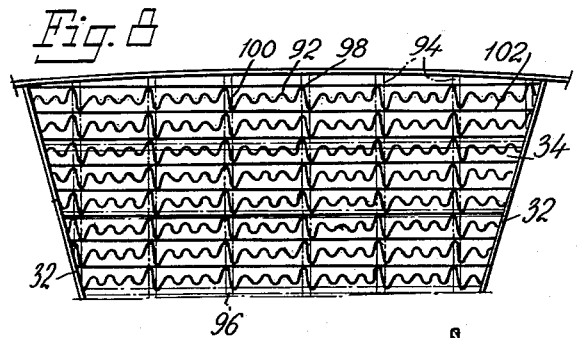
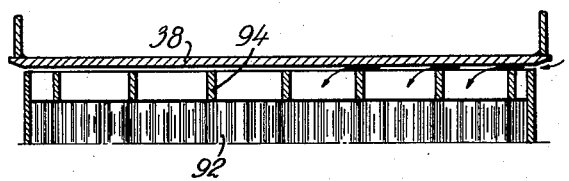
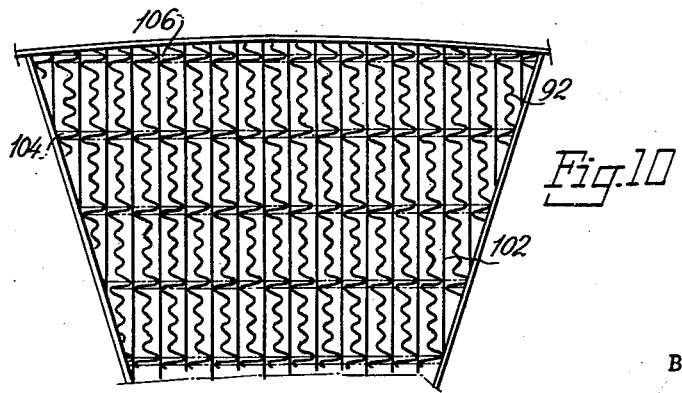
INVENTOR.

Jan. 19, 1965
J. KOCH
3,166,118
ROTOR END SEALING MEANS FOR ROTARY
REGENERATIVE HEAT EXCHANGERS
Filed March 2, 1960
4 Sheets-Sheet 4
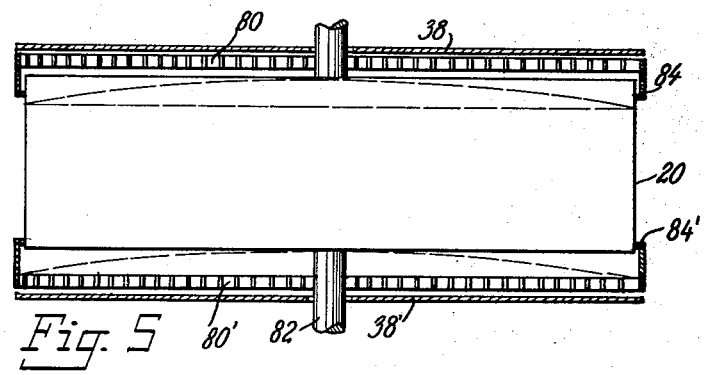
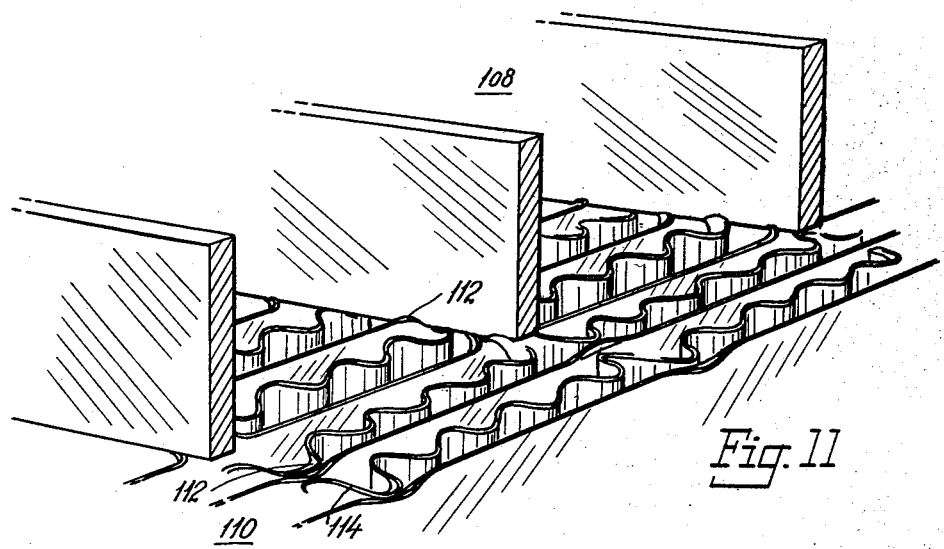
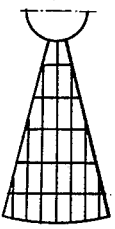
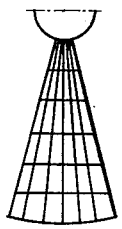
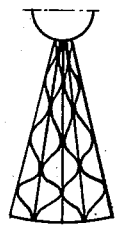
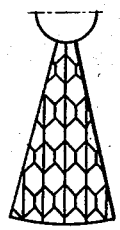
INVENTOR.

United States Patent Office 3,166,118
Patented Jan. 19, 1965

3,166,118
ROTOR END SEALING MEANS FOR ROTARY
REGENERATIVE HEAT EXCHANGERS
Jakob Koch, Heidelbergerstrasse 27, Edingen, near
Heidelberg, Germany
Filed Mar. 2, 1960, Ser. No. 12,348
6 Claims. (Cl. 165—9)

The present invention relates to rotary regenerative heat exchangers and has particular reference to such exchangers utilized as air preheaters for utilizing the heat of the waste gases from furnaces to preheat the combustion air supplied to the furnace. Such exchangers are characterized by rotors filled with heat exchanging material which turn relative to stationary housing structure providing ducts for flow of the heat exchanging media and the present invention is directed to the problem of improving the seals for preventing cross flow leakage of the fluid media between the end faces of the rotor and the confronting portions of the stationary structure.

Because of the fact that the fluid media passing through such exchangers are at different pressures as well as different temperatures, leakage streams pass through the clearance spaces adjacent to the end plates of the casing structure which houses the rotor and reduce the efficiency of the apparatus. Although attempts have been made to locate the sealing plates which confront the inactive portions of the rotor which are passing from one to the other of the ducts as close as possible to the end faces of the rotor in order to maintain the clearance gap as small as possible, there is a definite limit to the minimum gap that can be maintained, since rubbing contact between the confronting parts must be avoided with certainty. In the usual form of construction the rotor is divided by a number of radial partitions into a plurality of sector shaped compartments each filled with a multiplicity of closely spaced thin sheet metal elements constituting the regenerative heat exchanging material.

The end plates confronting the rotor ends for the purpose of providing seals for preventing cross flow between the ducts, hereinafter referred to as sector plates, and the ends of the elements forming the regenerative material would provide a highly efficient labyrinth sealing effect if such elements were assembled so that their end edges confronting the respective sector plates were accurately located in planes parallel with and close to the planes of the faces of the respective sector plates. As a practical matter, however, such accuracy of assembly is not possible because of the fact that in rotors of the size usually employed in such apparatus, which may be as large as ten meters in diameter or even larger, many hundreds of regenerative elements are required, which precludes the highly accurate assembly of the parts that is desired. Also, it is not practically possible to machine the end faces of the rotors after the assembling of the elements, in order to provide accurately plane end surfaces, because of the size of the rotors. Even if such machining were mechanically feasible, the cost would be prohibitive.

Because of the above noted circumstances, efficient labyrinth type seals at the rotor ends have not been possible, because of the irregular placement of the edges of the regenerative elements, and the primary object of the present invention is to improve upon prior structures by interposing between the end edges of the regenerative elements and the confronting sealing surfaces of the sector plates, metal gratings comprised of rigid cross bars the exposed edges of which provide planar envelope surfaces which can be located accurately to provide close clearance gaps between the rotor ends and the confronting sector plates and which are highly effective as one of the elements of a labyrinth type sealing means.

For a better understanding of preferred forms of apparatus for carrying into effect the above noted general object and other and more detailed objects hereinafter appearing, reference may best be had to the ensuing portion of this specification, taken in conjunction with the accompanying drawings forming a part hereof.

In the drawings:

FIG. 3 is a fragmentary vertical section on enlarged scale of a part of a prior form of heat exchanger not embodying the present invention;

FIG. 4 is a section similar to FIG. 3 showing the same type of apparatus but embodying the present invention;

FIG. 5 is a diagrammatic fragmentary vertical section of a modified form of apparatus embodying the invention;

FIG. 8 is a fragmentary broken top plan view of a further example of a rotor embodying the invention;

FIG. 9 is a fragmentary vertical section of the structure shown in FIG. 8;

FIG. 10 is similar to FIG. 8 of still another modification of the invention;

FIG. 11 is a fragmentary perspective of still another modification of the invention; and FIGS. 12 to 15 inclusive each illustrate different modifications of specific forms of grating suitable for use with the invention.

Figure 1:
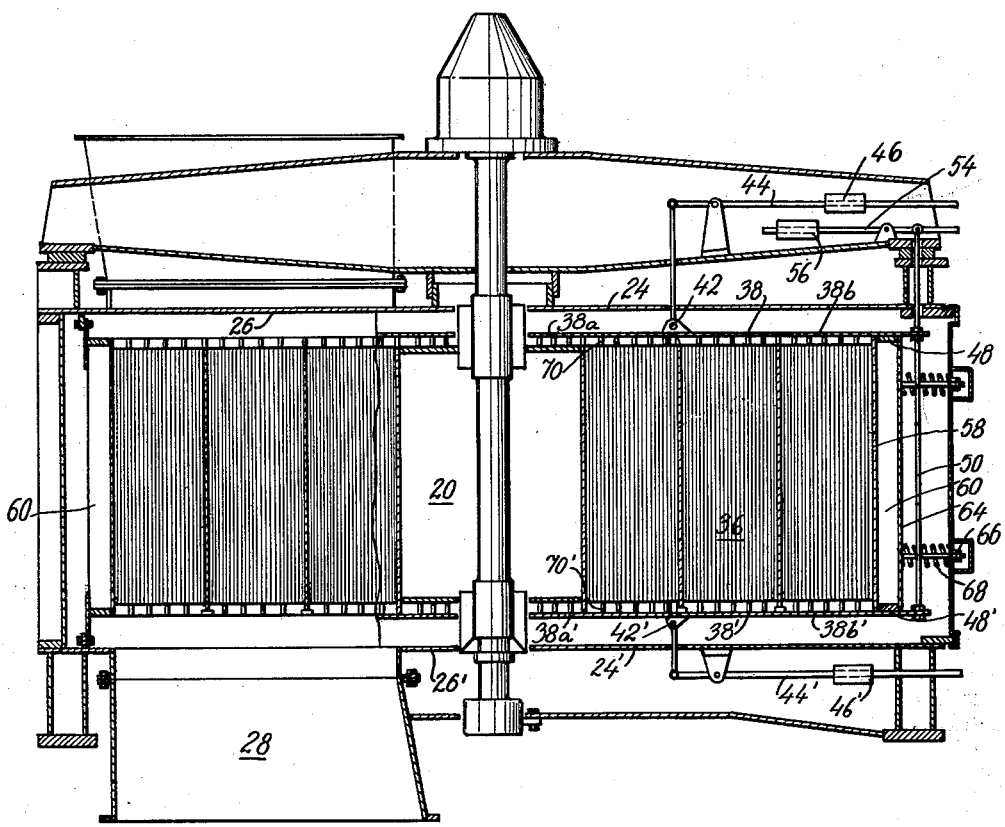
FIG. 1 is a vertical section, taken on line 1—1 of FIG. 2, of a rotary regenerative heat exchanger embodying the invention.
Figure 2:
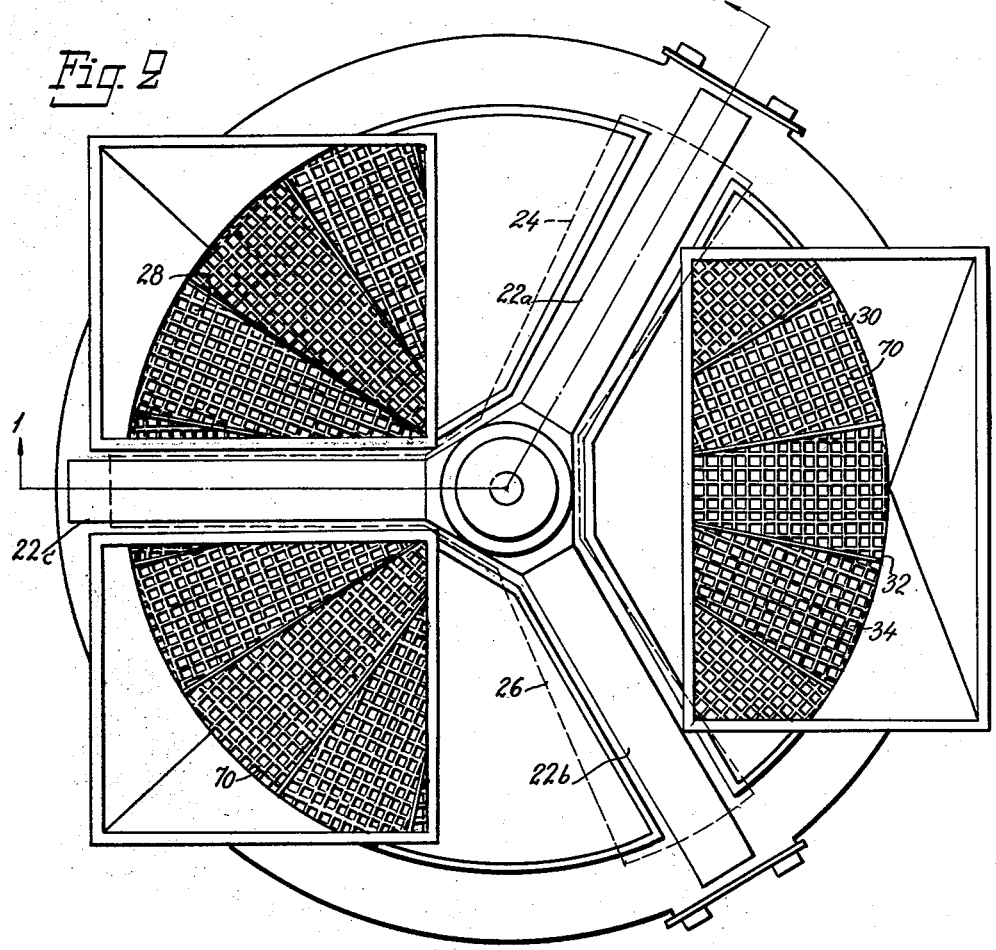
FIG. 2 is a top plan view of the apparatus shown in FIG. 1.

Referring now to the apparatus shown in FIGS. 1 and 2, the stationary structure comprises a main upper support for carrying the rotor 20, the support being in the form of three arms 22a, 22b and 22c extending radially from the axis about which the rotor turns. The arms 22a and 22b are located, respectively, above fixed cover or end plates 24 and 26, forming a part of the casing structure separating the large gas channel or duct 28 from the small air channel or duct 30. Similar end plates are provided at the lower end of the rotor, one of which being shown at 24'. The third arm 22c bisects the large gas duct 28.

In the case of an air preheater, it is usually found expedient and advantageous to make the included angle of the gas channel about double that of the air channel so that, as shown in the present embodiment, the three arms of the supporting beam are symmetrically arranged with an angle of 120° between the adjacent arms.

The rotor 20 is divided in the usual manner by radial partitions 32 into sector shaped compartments 34, filled in conventional fashion with axially extending regenerative elements 36 in the form of closely spaced thin sheet metal plates providing a multiplicity of axially extending passages of relatively small cross sectional area through the rotor.

In addition to the fixed end plates 24 and 26 at the upper end of the rotor, and corresponding plates 24' and 26' at the lower end of the rotor, all of which are substantially spaced axially from the rotor ends, the stationary structure further includes sector plates located closely adjacent to the rotor ends and cooperating therewith to provide the labyrinth seals for preventing the cross flow of fluid media from one to the other of the ducts which carry them. Two sets of such plates are employed to provide the seals for separating the two fluid duct systems, each of which sets comprises an upper and a lower sector plate and one of such sets being illustrated in FIG. 1. In the embodiment illustrated the sector plates 38 and 38' are formed respectively by inner sections 38a and 38a' and outer sections 38b and 38b', the sections being hingedly connected by the joints 42 and 42' respectively. These sector plates are movably mounted and carried in desired closely spaced relation to the ends of the rotor by means of the linkage systems 44 and 44' controlled by the adjustable counterweights 46 and 46' respectively. The outer ends of the hinged sections 38b and 38b' are connected by the distance rod 50 so as to be constrained to move together in vertical direction and their weight is carried by the linkage system 54 and adjustable counterweight 56. By means of this construction, which insofar as the present invention is concerned is known and of conventional nature, the sector plates may be adjusted to provide a close clearance gap between themselves and the ends of the rotor, which gap may be maintained relatively constant in spite of distortion of the rotor due to thermal stresses.

The rotor 20 has an outer wall 58 which at its upper and lower ends carries circumferential flange rings 48 and 48' respectively so that outside the wall 58 an annular chamber 60 is formed in which a plurality of axially extending radial strips 60 are mounted.

For sealing the rotor peripherally adjustable jacket plates 64 are employed, being positioned by the adjustable stops 66 and biased into proper position by the means of the springs 68. Since this structure forms no part of the invention claimed herein, it need not be described in further detail.

As previously noted, the present invention is directed to providing improved sealing at the rotor ends as compared with previously known structures, and for a better understanding of how this is accomplished, reference may now be had advantageously to FIGS. 3 and 4. In FIG. 3 prior conventional structure is shown in which the outer end portion of a sector plate 38 is shown provided with a peripheral vertical wall 72 cooperating with a sealing strip 76 mounted on the part 74 of the stationary structure. The regenerative elements 36 are shown as they usually are assembled in practice, with the end edges thereof being at variable distances from the confronting face of the sector plate 38. As will be obvious, an effective labyrinth type seal is not provided. In accordance with the present invention the elements 36 are made shorter than the separating partitions 32 forming the sector-like compartments and in the spaces thus provided rigid metal grids are located which provide plane envelope surfaces confronting the sealing surface of the sector plate. Because of the rigidity of the grating and the true planar nature of the envelope surface the sector plate can be adjusted to provide a much smaller clearance, without danger of rubbing contact between the parts, than would otherwise be the case. In the embodiment illustrated in FIGS. 1 and 2 the grating employed is in the form of a square mesh grid, and as will be observed from the drawings the mesh of this grid provides openings of substantially larger cross section than the cross section of the channels between the elements of the regenerative material. Since the purpose of the gratings is to provide a seal and not primarily to provide a large area of heat exchanging surface a relatively large mesh grid is suitable, which is of substantial advantage since for the purposes of this invention large mesh gratings used primarily for other purposes, are available at relatively very low cost. As shown in FIG. 4, gratings such as are illustrated at 70, may readily be held in place by pins 78 passing through the partitions 32. It will be understood of course that gratings are utilized at both ends of the rotor, and while the grating 70, shown in FIG. 4 might be unfastened and held in place by gravity, it is obvious that some fastening means must be employed for the grating at the lower end of the rotor. Obviously, insofar as the invention is concerned any suitable form of fastening means may be employed.

While a most convenient form of construction is that shown in FIG. 2 wherein a single grating is used for each compartment, it is obvious that in very large units the grating in each compartment may be sub-divided into a number of sections, and on the other hand in smaller units the entire end face of the rotor may be covered by a single grating.

Figure 6:
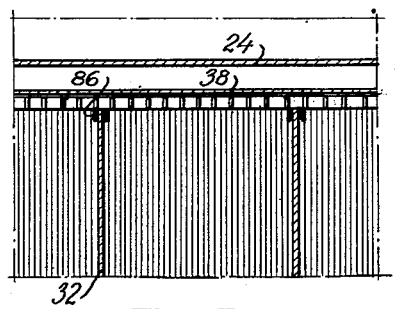
FIG. 6 is a fragmentary vertical section on enlarged scale illustrating certain details of the construction diagrammatically shown in FIG. 5.

With heat exchangers of the kind under consideration, counter current flow of the fluid media between which heat is being exchanged is the general rule. Such flow requires that the cool medium which is to be heated and the cooled medium from which heat has been extracted, enter and emerge, respectively, at one end of the rotor, usually referred to as the cold end. Similarly, the fluid that has been heated emerges from, and the hot fluid to be cooled enters, the opposite or hot end of the rotor. Because there may be a very considerable temperature difference between these ends, the rotors tend to warp into a dished form, and in the case of large diameter rotors this may become a serious problem. In FIG. 5 there is shown a modification, embodying the principles of the invention, designed to provide for effective end sealing even with a warped rotor. In this form the end gratings 80 and 80', confronting respectively the sector plates 38 and 38', are each a single rigid unit covering the entire end face of the rotor. These are fixed only at their centers, to the center post 82 of the rotor. As will be seen from FIG. 5, warping of the rotor to a form shown in somewhat exaggerated fashion by the dotted lines in the figure will not disturb the sealing gap between the rotor end faces and the respective sector plates and for the provision of sealing between the sector plates and the remaining portion of the rotor, peripheral sealing members engaging the outer shell of the rotor, as indicated at 84 and 84' in FIG. 5 may be employed, together with radial sealing strips 86 cooperating with the radial partitions of the rotor, as shown in FIG. 6.

Figure 7:
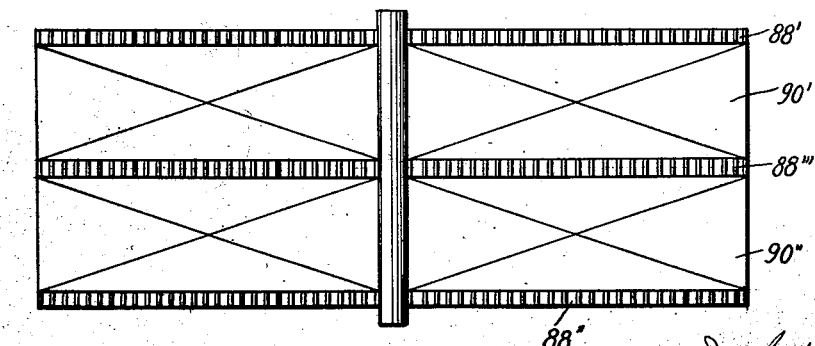
FIG. 7 is a diagrammatic section of another form of rotor embodying the invention.

FIG. 7 illustrates a further modification of rotor construction particularly suitable for use with rotors of more than usual height. In this form, in addition to the end gratings 88' and 88'' an intermediate central grating 88''' is used with the center and lower gratings acting to provide regenerative supports, respectively, for the two sets of regenerative elements indicated diagrammatically at 90' and 90''.

In rotors having undulated or corrugated elements 92 as shown in FIGS. 8 and 9 arranged parallel to the periphery it is preferable to construct the grating 94 to apply it so that a bar 96 of the grating extends along each of the straight lines defined by the points of contact 98 of the distance-maintaining corrugations 100. These should also lie where the corrugations themselves effect a sub-division of the sector 34. The corrugated distance elements 92 are separated by plane elements 102. As the spacing of the corrugations of corrugated elements normally amounts to about 78 mm. in such a case a breadth of mesh of for example 26 or 39 mm. or even, if desired, 78 mm. should be used. In a corresponding manner, as shown in FIG. 10, it is also advisable even with an exact or approximate radial arrangement of the regenerative elements 92 and 102 when using corrugated distance pieces 92, to arrange the grating bars 104 to cover such lines of contact 106. In FIG. 9 arrows indicate the labyrinth sealing effect obtained.

FIG. 11 shows an arrangement in which the grating 108 at the rotor end face 110 is formed as a structural unit or sector of a kind which is forced against the protruding end edges 112 of irregularly assembled regenerative elements 114 to deform such protruding edges and provide a solid, close and plane contact between the edges of the bars of the grating and the edges of the mass of regenerative elements.

It will be evident that many specific different forms of gratings may be employed within the scope of the invention and by way of example but without limitation, dimensions and arrangements such as the following may advantageously be employed. With the square mesh grating shown in FIG. 2 the size of the mesh may advantageously lie between the limits of 30 x 30 mm. to 40 x 40 mm.

A grating made in the form of that shown in FIG. 12 may for example have a mesh of from between 30 x 60 mm. up to 40 x 80 mm. Both of the above kinds have the advantage that they are readily available as mass produced products already on the market. The height of the bars of such commercial gratings is usually from 20 to 40 mm., the bars being a few millimeters thick. The bars are usually of rectangular cross section but may have rounded corners rather than sharp edges, which is advantageous for the present use, since the rounded corners reduce flow resistance past or through the gratings.

The specific shape of the apertures through the gratings is not important and by way of example there is shown in FIGS. 13, 14 and 15 various other alternative configurations for gratings suitable for the purposes of the present invention.

In all cases where gratings of the kind contemplated by the present invention are employed to cover the end edges of groups of regenerative elements, there is always the possibility of some leakage between the unevenly placed end edges and the confronting face of the grating. However, and particularly when the grating is pressed against the pack of elements so as to deform protruding edges, the parts are in such close relationship that little if any appreciable leakage takes place, which is moreover resisted by what may be termed a secondary labyrinth packing effect between the elements and the grating.

While various modifications of apparatus suitable for carrying the invention into effect have been described and illustrated, the invention is not limited in its scope to such examples and is to be understood as including all form of apparatus falling within the scope of the appended claims.

What I claim is:

1. In a rotary regenerative heat exchanger of the type in which a stationary component provides adjacent ducts for flow of separate streams of heat exchanging fluid media through the exchanger and in which heat exchange is effected by means of regenerative heat exchanging material carried by a rotor component so as to pass through said ducts successively and in alternation, the combination of axially spaced apart sector plates forming a part of said stationary component extending transversely of said ducts and including inperforate sector portions having plane sealing surfaces located between said ducts, and a rotor component mounted to revolve between said sector plates, said rotor components being substantially filled with said regenerative heat exchanging material and said material providing a multiplicity of channels of relatively small cross sectional area for flow of said fluid media through said rotor component and said rotor component carrying at it's opposite ends material gratings disposed between the ends of the regenerative material and the sector plates between which the rotor component revolves, said grating comprising a plurality of bars interconnected to form relatively rigid grid means having openings therethrough, the cross sectional areas of the individual openings being substantially larger than the cross sectional area of the individual channels, the exposed edges of said bars presenting smooth planar envelope surfaces located in closely adjacent relationship to the confronting sealing surfaces of the sector plates at the respective ends of the rotor component, whereby to provide an efficient labyrinth type seal resisting cross flow of fluid from one to the other of said ducts between the ends of the rotor component and the respectively adjacent sector plates.

2. In a rotary regenerative heat exchanger of the type in which a stationary component provides adjacent ducts for flow of separate streams of heat exchanging fluid media through the exchanger past axially spaced apart sector plates having imperforate sector portions providing transversely extending plane sealing surfaces separating the ducts and in which heat exchange is effected by means of regenerative heat exchanging material carried by a rotor component mounted to rotate between said sector plates so as to cause said regenerative heat exchanging material to pass through said ducts successively and in alternation, a rotor component comprising an outer generally cylindrical shell, regenerative heat exchanging material comprising a multiplicity of heat absorbing and rejecting elements providing a multiplicity of channels of relatively small cross sectional area for flow of heat exchanging fluid media through the rotor, and metal gratings comprising a plurality of bars interconnecting to form relatively rigid grid means having openings therethrough, the cross sectional area of the individual openings being substantially greater than the cross sectional areas of the individual channels, said grating being carried by and extending across the ends of the rotor axially outside of said heat exchanging material and said bars being interconnected so that the envelope surface defined by the exposed edges of the bars is smoothly planar, whereby said rotor is adapted to be mounted with said edges closely adjacent to the plane sealing surfaces of the sector plates of a cooperating stationary component to provide an efficient labyrinth type of seal for resisting cross flow of fluid between the ends of the rotor and the sector plates.

3. A rotor component as defined in claim 2 in which the cross sectional areas of the individual openings through said grid means are several times larger than the cross sectional areas of the individual channels between said heat absorbing and rejecting elements.

4. A rotor component as defined in claim 3 in which the rotor is divided by radial partition walls into sector-shaped compartments and the grating is formed by a plurality of grid means separately secured to said radial partition walls.

5. A rotor component as defined in claim 3 in which said regenerative heat exchanging material is in the form of thin deformable material and in which the grid means is located axially relative to the adjacent ends of the sheet metal plates so that the inner edges of the bars of the grid means are in contact with the end edges out of shortest of the sheet metal plates, the end edges of longer ones of said plates being deformed by the bars of the grid means to permit the bars to contact the end edges of the shorter sheets.

6. A rotor component as defined in claim 2 in which the gratings are secured to the rotor only at the radially central portion thereof, whereby to permit the radially outer portions of the heat exchanging material to move axially toward and away from the grating due to heat distortion of the heat exchanging material.

References Cited in the file of this patent

UNITED STATES PATENTS

| 1,762,320 | Wood | June 10, 1930 |
| 2,563,415 | Pennington | Aug. 7, 1951 |
| 2,665,120 | Blomquist | Jan. 5, 1954 |
| 2,680,008 | Karlsson | June 1, 1954 |
| 2,738,958 | Hodge | Mar. 20, 1956 |
| 2,795,400 | Stark | June 11, 1957 |
| 2,873,952 | Mudersbach et al. | Feb. 17, 1959 |
| 3,058,723 | Nilsson et al. | Oct. 16, 1962 |

FOREIGN PATENTS

| 512,265 | Great Britain | Aug. 31, 1939 |
| 843,731 | Germany | July 14, 1952 |
| 910,711 | Germany | May 6, 1954 |